(12) United States Patent
Suzuki

(10) Patent No.: US 8,913,958 B2
(45) Date of Patent: Dec. 16, 2014

(54) ACCESS CONTROL METHOD, WIRELESS COMMUNICATION SYSTEM, BASE STATION DEVICE, MOBILE STATION DEVICE, AND ACCESS CONTROL PROGRAM

(75) Inventor: Kohki Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 332 days.

(21) Appl. No.: 13/501,396

(22) PCT Filed: Oct. 14, 2010

(86) PCT No.: PCT/JP2010/068053
§ 371 (c)(1),
(2), (4) Date: Apr. 11, 2012

(87) PCT Pub. No.: WO2011/046172
PCT Pub. Date: Apr. 21, 2011

(65) Prior Publication Data
US 2012/0196641 A1    Aug. 2, 2012

(30) Foreign Application Priority Data

Oct. 16, 2009 (JP) ................................ P2009-239178

(51) Int. Cl.
*H04B 7/00* (2006.01)
*H04W 48/02* (2009.01)
*H04W 12/08* (2009.01)
*H04W 8/18* (2009.01)
*H04W 84/04* (2009.01)

(52) U.S. Cl.
CPC .............. *H04W 48/02* (2013.01); *H04W 12/08* (2013.01); *H04W 8/186* (2013.01); *H04W 84/045* (2013.01)
USPC ..... 455/41.2; 455/41.1; 455/41.3; 455/435.2; 709/225; 709/229

(58) Field of Classification Search
USPC ............. 455/435.2, 41.1–41.3; 709/225, 229
See application file for complete search history.

(56) References Cited

U.S. PATENT DOCUMENTS 8,027,687 B2 * 9/2011 Jung et al. ...................... 455/450
2007/0066329 A1 3/2007 Laroia et al.
(Continued)

FOREIGN PATENT DOCUMENTS

JP   2009-510835 A   3/2009

OTHER PUBLICATIONS

3rd Generation Partnership Project; "Technical Specification Group Services and System Aspects; Service requirements for Home NodeBs and Home eNodeBs, (Release 9)", 3GPP TS 22.220, V9.0.0, Mar. 2009, pp. 1-22.

(Continued)

*Primary Examiner* — Fayyaz Alam
(74) *Attorney, Agent, or Firm* — Birch, Stewart, Kolasch & Birch, LLP

(57) ABSTRACT

A first access method changer changes an access control method of a base station device to a third access control method in which a control with a first access control method and a control with a second access control method are performed simultaneously. The first access control method is such that a mobile station device subscribing to the group is allowed to access the base station device. The second access method is such that any mobile station device is allowed to access the base station device. A second access method changer changes the access control method of the base station device from the third access control method changed by the first access method changer to the first access control method.

20 Claims, 8 Drawing Sheets

(56) References Cited

U.S. PATENT DOCUMENTS

| | | | |
|---|---|---|---|
| 2009/0070694 A1* | 3/2009 | Ore et al. | 715/764 |
| 2010/0238858 A1* | 9/2010 | Kim et al. | 370/328 |
| 2010/0272086 A1* | 10/2010 | Jung et al. | 370/338 |
| 2011/0021201 A1* | 1/2011 | Lee et al. | 455/444 |
| 2011/0039558 A1* | 2/2011 | Lee et al. | 455/434 |
| 2011/0045826 A1* | 2/2011 | Kim et al. | 455/426.1 |
| 2011/0122822 A1* | 5/2011 | Wu et al. | 370/328 |
| 2012/0039214 A1* | 2/2012 | Kim et al. | 370/254 |

OTHER PUBLICATIONS

Alcatel-Lucent et al., "Congested H(e)NB Hybrid Access Mode cell", 3GPP TSG-RAN WG3 Meeting #64, R3-091053, San Francisco, U.S.A., May 4-8, 2009, 4 pages.

Draft Meeting Report, Meeting of 3GPP TSG RAN WG3 Meeting #64, San Francisco, May 4-8, 2009, 4 pages.

TSG SA WG1, "Cover sheet for TS 22.220 submitted for approval", 3GPP TSG SA Plenary Meeting #43, SP-090087, Biarritz, France, Mar. 9-12, 2009, 24 pages.

* cited by examiner

ACCESS CONTROL METHOD, WIRELESS COMMUNICATION SYSTEM, BASE STATION DEVICE, MOBILE STATION DEVICE, AND ACCESS CONTROL PROGRAM

TECHNICAL FIELD

The present invention relates to an access control method, a wireless communication system, a base station device, a mobile station device, and an access control program.

Priority is claimed on Japanese Patent Application No. 2009-239178, filed Oct. 16, 2009, the content of which is incorporated herein by reference.

BACKGROUND ART

Recently, as a base station device (referred to as a base station) in a wireless communication system, a home cell has been proposed as well as a macrocell of related art which has a wide service area. The home cell is designed to provide services in a narrow area and, in some cases, services dedicated for specific users. Operation of the home cell has been considered for 3GPP E-UTRA (The 3rd Generation Partnership Project Evolved Universal Terrestrial Radio Access) (see, for example, Non-Patent Document 1).

Currently, as methods of controlling an access between a base station of a home cell (referred to as a home cell base station) and a mobile station device (referred to as a mobile station), the three following methods have been proposed. The first method is an open access method. The second method is a hybrid access method. The third method is a closed access method. Regarding the open access method, any mobile station can access the home cell base station, as in the case of a macrocell. Additionally, regarding the hybrid access method, not only mobile stations subscribing to a CSG (Closed Subscriber Group; a group of specific subscribers, such as employees in a corporation, users in an institution, or family members in a home), but also mobile stations not subscribing to the CSG, can access the home cell base station. Further, regarding the closed access method, only mobile stations subscribing to the CSG can access the home cell base station.

On the other hand, the use of the home cell during roaming has been considered. In other words, a mobile station accesses a home cell base station in a VPLMN (Visited Public Land Mobile Network) in some cases. For this reason, it is expected that the opportunity for a mobile station not subscribing to the CSG to access the home cell base station will increase.

The section 5.3.1 of Non-Patent Document 1 discloses that a mobile station subscribing to the CSG performs manual CSG selection, thereby a CSG membership being offered to another mobile station camping on the VPLMN cell. Here, the CSG membership is offered without exchange of information related to the HPLMN and the CSG of the other mobile station.

CITATION LIST

Non-Patent Document

[Non-Patent Document 1] "3GPP TS22.220", [online], [searched on Sep. 14, 2009], Internet <URL: http://www.3gpp.org/ftp/Specs/archive/22_series/22.220/22220-900.zip>

DISCLOSURE OF THE INVENTION

Problems to be Solved by the Invention

By the way, regarding the home cell of the related art which uses the closed access method, a mobile station accesses only a home cell base station assigned with identification information of a CSG (referred to as a CSG ID) which is included in an allowed CSG list or a user CSG list stored by the mobile station. In other words, in the related art, the mobile station cannot access, except in case of an emergency call, a home cell base station assigned with only the CSG ID not included in the CSG list (see, for example, section 5.3.2 of Non-Patent Document 1).

In the related art, on the other hand, if the CSG membership is offered to a mobile station, it is necessary for the mobile station to access the home cell base station.

However, if the CSG ID assigned to the home cell base station is not included in the CSG list stored by the mobile station, the mobile station cannot access the home cell base station, thereby causing a problem in that a membership cannot be offered to the mobile station.

The present invention has been made in view of the above situations and provides an access control method, a wireless communication system, a base station device, a mobile station device, and an access control program which can reliably offer a membership to a group.

Means for Solving the Problems (1) The present invention has been made to solve the above problems. An aspect of the present invention is an access control method for a wireless communication system including: a base station device which is assigned with identification information of a group and which is configured to perform a control with a first access control method in which a mobile station device subscribing to the group is allowed to access the base station device; and a mobile station device configured to store identification information of a group to which the mobile station device subscribes and to access a base station device assigned with the identification information of the group. The access control method includes: a first step of a first access method changer changing an access control method of the base station device to a third access control method in which the control with the first access control method and a control with a second access control method are performed simultaneously, the second access method being such that any mobile station device is allowed to access the base station device; a second step of an identification information updating unit storing, in the mobile station device, the identification information of the group assigned to the base station device having changed the access control method to the third access control method in the first step; and a third step of a second access method changer changing the access control method of the base station device from the third access control method changed in the first step to the first access control method.

(2) Regarding the access control method according to the aspect of the present invention, the first step includes changing the access control method to the third access control method based on a subscribing device addition request from the mobile station device subscribing to the group having the identification information assigned to the base station device.

According to the above configuration, the wireless communication system changes the access control method to the third access control method based on the subscribing device addition request from the mobile station device subscribing to the group having the identification information assigned to the base station device. Accordingly, the mobile station device subscribing to the group can reliably offer a group membership to the mobile station device not subscribing to the group.

(3) Regarding the access control method according to the aspect of the present invention, the third step includes changing the access control method to the first access control method based on a completion report indicating that the identification information of the group is stored in the mobile station device in the second step.

According to the above configuration, the wireless communication system changes the access control method to the first access control method based on the completion report indicating that the identification information of the group is stored in the mobile station device. Accordingly, the wireless communication system can change the access control method to the first access control method immediately after offering a group membership to the mobile station device, thereby reducing opportunities for another mobile station device not having the group membership to access the base station device.

(4) Regarding the access control method according to the aspect of the present invention, the third step includes changing the third access control method to the first access control method after a predetermined period elapses from the time the access control method is changed to the third access control method in the first step.

(5) Regarding the access control method according to the aspect of the present invention, the first step and the second step are periodically repeated.

According to the above configuration, the wireless communication system periodically repeats the first step and the second step. Accordingly, the wireless communication system can, for example, set a validity period to the group membership, and update the group membership when the access control method is changed to the third access control method, thereby preventing the membership to an unused group from remaining for a long time.

(6) Regarding the access control method according to the aspect of the present invention, the third step includes changing the access control method to the first access control method based on the number of mobile station devices subscribing to the group.

According to the above configuration, the wireless communication system changes the access control method to the first access control method based on the number of mobile station devices subscribing to the group, thereby controlling the number of mobile station devices subscribing to the group.

(7) Regarding the access control method according to the aspect of the present invention, the third step includes changing the access control method to the first access control method based on the number of mobile station devices subscribing to the group and accessing the base station device.

According to the above configuration, the wireless communication system changes the access control method to the first access control method based on the number of mobile station devices subscribing to the group and accessing the base station device, thereby controlling the number of mobile station devices subscribing to the group and accessing the base station device.

(8) Additionally, another aspect of the present invention is an access control method for a base station device which is assigned with identification information of a group and which is configured to perform a control with a first access control method in which a mobile station device subscribing to the group is allowed to access the base station device. The access control method includes: a first step of a first access method changer changing an access control method of the base station device to a third access control method in which the control with the first access control method and a control with a second access control method are performed simultaneously, the second access method being such that any mobile station device is allowed to access the base station device; and a second step of a second access method changer changing the access control method of the base station device from the third access control method changed in the first step to the first access control method.

(9) Further, another aspect of the present invention is an access control method for a mobile station device configured to store identification information of a group to which the mobile station device subscribes and to access a base station device which is assigned with the identification information of the group. The access control method includes: a step of an identification information updating unit storing, in the mobile station device, the identification information of the group assigned to the base station device having changed an access control method to a third access control method in which a control with a first access control method and a control with a second access control method are performed simultaneously, the first access control being such that the mobile station device subscribing to the group is allowed to access the base station device, and the second access method being such that any mobile station device is allowed to access the base station device.

(10) Moreover, another aspect of the present invention is a wireless communication system including: a base station device which is assigned with identification information of a group and which is configured to perform a control with a first access control method in which a mobile station device subscribing to the group is allowed to access the base station device; and a mobile station device configured to store identification information of a group to which the mobile station device subscribes and to access a base station device assigned with the identification information of the group. The mobile station device includes: an identification information updating unit configured to store, in the mobile station device, the identification information of the group assigned to the base station device having changed an access control method to a third access control method in which the control with the first access control method and a control with a second access control method are performed simultaneously, the second access method being such that any mobile station device is allowed to access the base station device. The base station device includes: a first access method changer configured to change an access control method of the base station device to the third access control method; and a second access method changer configured to change the access control method of the base station device from the third access control method changed by the first access method changer to the first access control method.

(11) Additionally, another aspect of the present invention is a base station device which is assigned with identification information of a group and which is configured to perform a control with a first access control method in which a mobile station device subscribing to the group is allowed to access the base station device. The base station device includes: a first access method changer configured to change an access control method of the base station device to a third access control method in which the control with the first access control method and a control with a second access control method are performed simultaneously, the second access method being such that any mobile station device is allowed to access the base station device; and a second access method changer configured to change the access control method of the base station device from the third access control method changed by the first access method changer to the first access control method.

(12) Further, another aspect of the present invention is a mobile station device configured to store identification information of a group to which the mobile station device subscribes and to access a base station device which is assigned with the identification information of the group. The mobile station device includes: an identification information updating unit configured to store, in the mobile station device, the identification information of the group assigned to the base station device having changed an access control method to a third access control method in which a control with a first access control method and a control with a second access control method are performed simultaneously, the first access control being such that the mobile station device subscribing to the group is allowed to access the base station device, and the second access method being such that any mobile station device is allowed to access the base station device.

(13) Moreover, another aspect of the present invention is an access control program causing a computer of a base station device which is assigned with identification information of a group and which is configured to perform a control with a first access control method in which a mobile station device subscribing to the group is allowed to access the base station device, function as: a first access method changing means configured to change an access control method of the base station device to a third access control method in which the control with the first access control method and a control with a second access control method are performed simultaneously, the second access method being such that any mobile station device is allowed to access the base station device; and a second access method changing means configured to change the access control method of the base station device from the third access control method changed by the first access method changing means to the first access control method.

(14) Additionally, another aspect of the present invention is an access control program causing a mobile station device configured to store identification information of a group to which the mobile station device subscribes and to access a base station device which is assigned with the identification information of the group, function as: an identification information updating means configured to store, in the mobile station device, the identification information of the group assigned to the base station device having changed an access control method to a third access control method in which a control with a first access control method and a control with a second access control method are performed simultaneously, the first access control being such that the mobile station device subscribing to the group is allowed to access the base station device, and the second access method being such that any mobile station device is allowed to access the base station device.

Effects of the Invention

According to the present invention, it is possible to reliably offer a membership to a group.

BEST MODE FOR CARRYING OUT THE INVENTION

First Embodiment

Hereinafter, embodiments of the present invention are explained with reference to the drawings.

Figure 1:
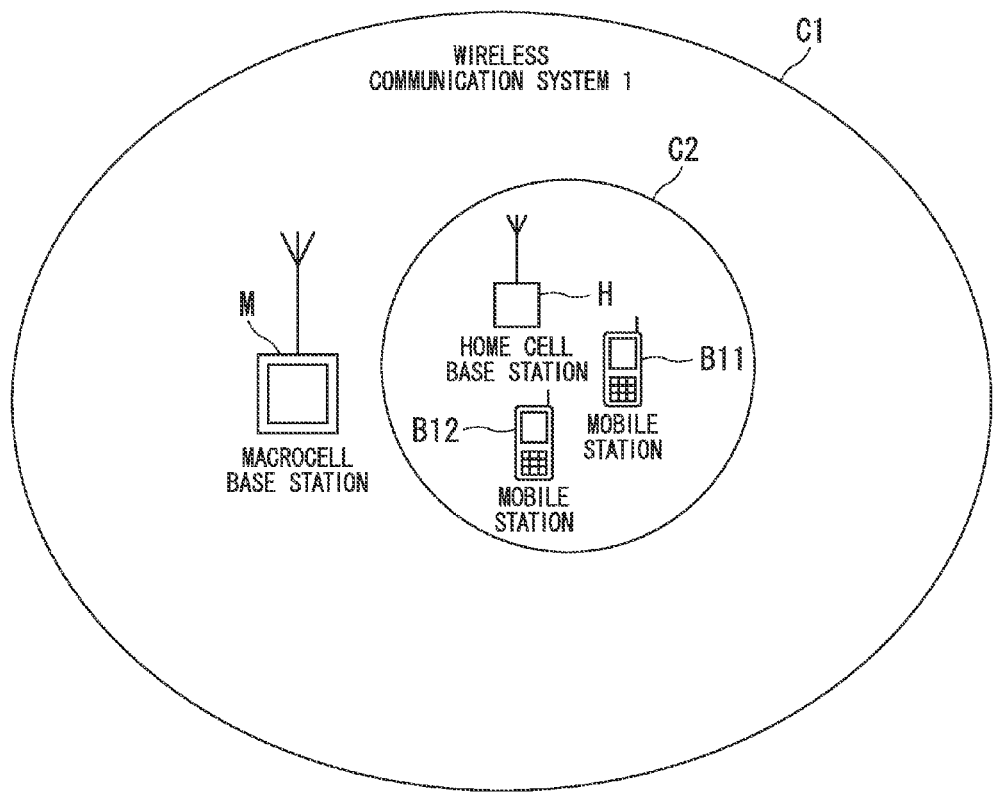
FIG. 1 is a schematic diagram illustrating a wireless communication system according to a first embodiment of the present invention.

FIG. 1 is a schematic diagram illustrating a wireless communication system 1 according to a first embodiment of the present invention. In FIG. 1, the wireless communication system 1 includes: a macrocell base station M; a home cell base station H; and mobile stations B11 and B12.

The macrocell base station M communicates with the home cell base station. A cell C1 denotes a coverage area of the macro cell base station M. The home cell base station H communicates with the mobile stations B11 and B12. Additionally, the home cell base station H is previously assigned with a CSG (Closed Subscriber Group; a group of specific subscribers, such as employees in a corporation, users in an institution, or family members in a home) ID. A cell C2 denotes a coverage area of the home cell base station H. Generally, the coverage areas of the home cell base stations are smaller than those of the macrocell base stations. However, the number of the cell base stations installed is generally greater than that of the macrocell base stations installed.

Here, the home cell base station H performs access control with a closed access method (first access control method) with respect to mobile stations. Regarding the closed access method, only mobile stations subscribing to the CSG can access the home cell base station H. Specifically, a mobile station can access (attach to) the home cell base station H if a CSG ID assigned to the home cell base station H is included in the allowed CSG list or user CSG list which is previously stored in the mobile station.

The access control method for the home cell base station includes an open access method (second access control method) and a hybrid access method (third access control method), other than the closed access method. Regarding the open access method, any mobile station can access the home cell base station, similarly to the case of the macrocell station. Regarding the hybrid access method, not only mobile stations subscribing to the CSG, but also mobile stations not subscribing to the CSG, can access the home cell base station.

In the first embodiment, the home cell base station H changes the access control method from the closed access method to the hybrid access method based on a CSG membership addition request (subscribing device addition request) from the mobile station B12 subscribing to the CSG having the CSG ID assigned to the home cell base station H. The mobile station B11 accesses the home cell base station H whose access control method is changed to the hybrid access method, registers the CSG ID to the allowed CSG list stored in the mobile station B11, and subscribes to the CSG. Then, the home cell base station H changes the access control method from the hybrid access method to the closed access method.

Hereinafter, the home cell base station H is referred to as a home cell base station h1. Additionally, the mobile station B1 is referred to as a mobile station b1.

(Regarding Home Cell Base Station h1)

Figure 2:
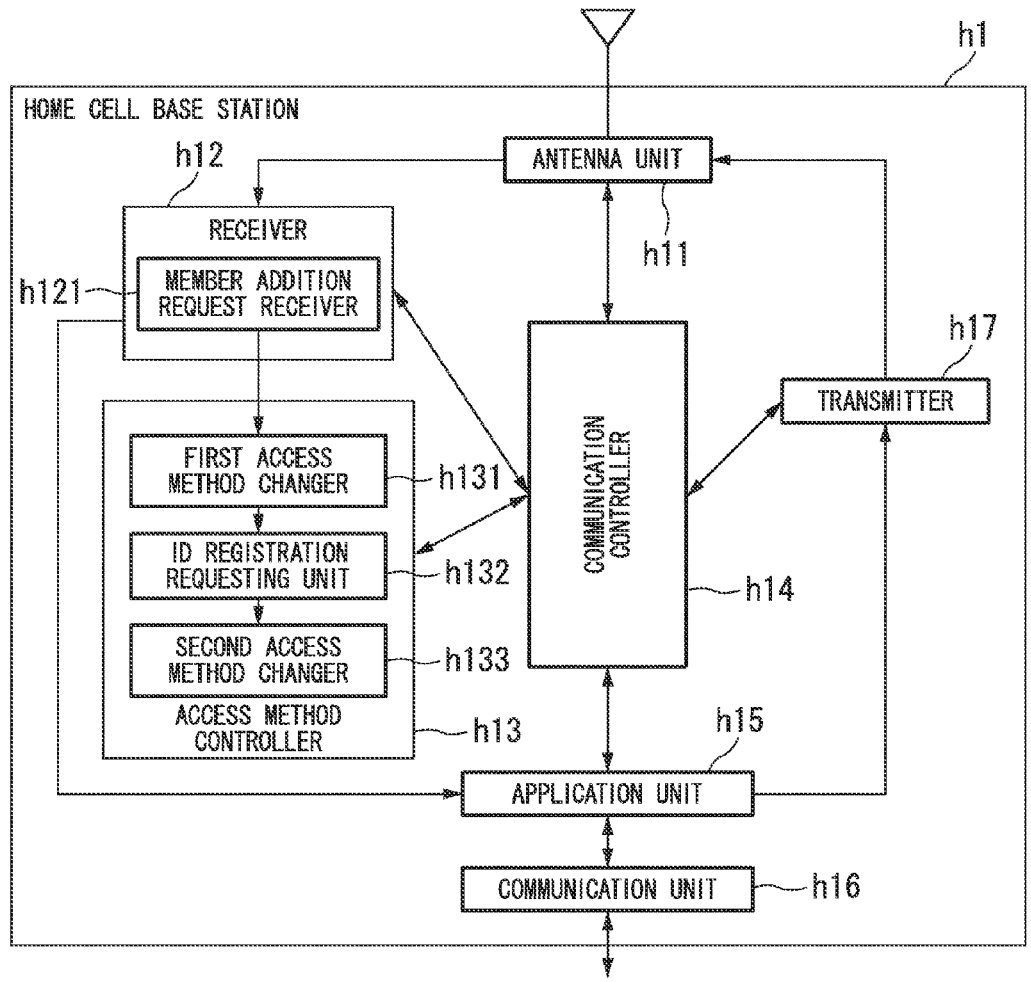
FIG. 2 is a schematic block diagram illustrating a configuration of a home cell base station according to the first embodiment.

FIG. 2 is a schematic block diagram illustrating a configuration of the home cell base station h1 according to the first embodiment. In FIG. 2, the home cell base station h1 includes: an antenna h11; a receiver h12; an access method controller h13; a communication controller h14; an application unit h15; a communication unit h16; and a transmitter h17. Here, the receiver h12 includes a member addition request receiver h121. Additionally, the access method controller h13 includes: a first access method changer h131; an ID registration requesting unit h132; and a second access method changer h133.

The antenna unit h11 receives radio signals from the mobile stations b1 and B12 through an antenna, and outputs the received signal to the receiver h12. Additionally, the antenna unit h11 transmits, to the mobile stations b1 and B12, a signal received from the transmitter h17 as a radio signal.

The receiver h12 downconverts the signal received from the antenna unit h11 to perform A/D conversion. Then, the receiver h12 demodulates and decodes the signal subjected to the A/D conversion to obtain reception information. Then, the receiver h12 outputs the obtained reception information to the access method controller h13, the communication controller h14, and the application unit h15. Here, the member addition request receiver h121 of the receiver h12 outputs, to the first access method changer h131, a CSG member addition request received from the mobile station B12 subscribing to the CSG having the CSG ID assigned to the home cell base station h1. The CSG member addition request is for the mobile station B12 subscribing to the CSG having the CSG ID assigned to the home cell base station h1 to request offering a CSG membership to another mobile station b1.

Upon receiving the CSG member addition request from the member addition request receiver h121, the first access method changer h131 outputs, to the communication controller h14, a change order for changing the access control method from the closed access method to the hybrid access method. In other words, the first access method changer h131 changes the access control method to the hybrid access method based on the CSG member addition request from the mobile station B12 subscribing to the CSG having the CSG ID assigned to the home cell base station h1.

If the access method is the hybrid access method, the ID registration requesting unit h132 outputs, to the communication controller h14, an ID registration request addressed to the mobile station b1 allowed the attachment. The ID registration request is a request for registering to a CSG list of the mobile station b1, the CSG ID of the CSG, the membership to which is offered in response to the CSG member addition request. The ID registration request includes the CSG ID. Additionally, the ID registration request may include a validity period of the membership to the CSG having the CSG ID. Further, if the mobile station b1 completes the registration of the CSG ID, the ID registration requesting unit h132 receives a completion response thereof (completion report) through the communication controller h14, and outputs the completion response to the second access method changer h133.

Upon receiving the completion response from the ID registration requesting unit h132, the second access method changer h133 outputs, to the communication controller h14, a change order for changing the access control method from the hybrid access method to the closed access method. In other words, the second access method changer h133 changes the access control method to the closed access method based on the completion response.

The communication controller h14 controls each unit of the home cell base station h1. For example, the communication controller h14 changes the access control method based on the change orders from the first access method changer h131 and the second access method changer h133. Additionally, for example, the communication controller h14 transmits the ID registration request received from the ID registration requesting unit h132, to the mobile station b1 through the transmitter h17 and the antenna unit h11. Additionally, the communication controller h14 receives the completion response thereof through the antenna unit h11 and the receiver h12, and outputs the completion response to the ID registration requesting unit h132.

The application unit h15 processes the reception information received from the receiver h12. Additionally, the application unit h15 communicates with another device through the communication unit h16.

The transmitter h17 encodes and modulates transmission information received from the communication controller h14 and the application unit h15 to perform D/A conversion. Then, the transmitter h17 upconverts the signal subjected to the D/A conversion to the antenna unit h11.

(Regarding Mobile Station b1)

Figure 3:
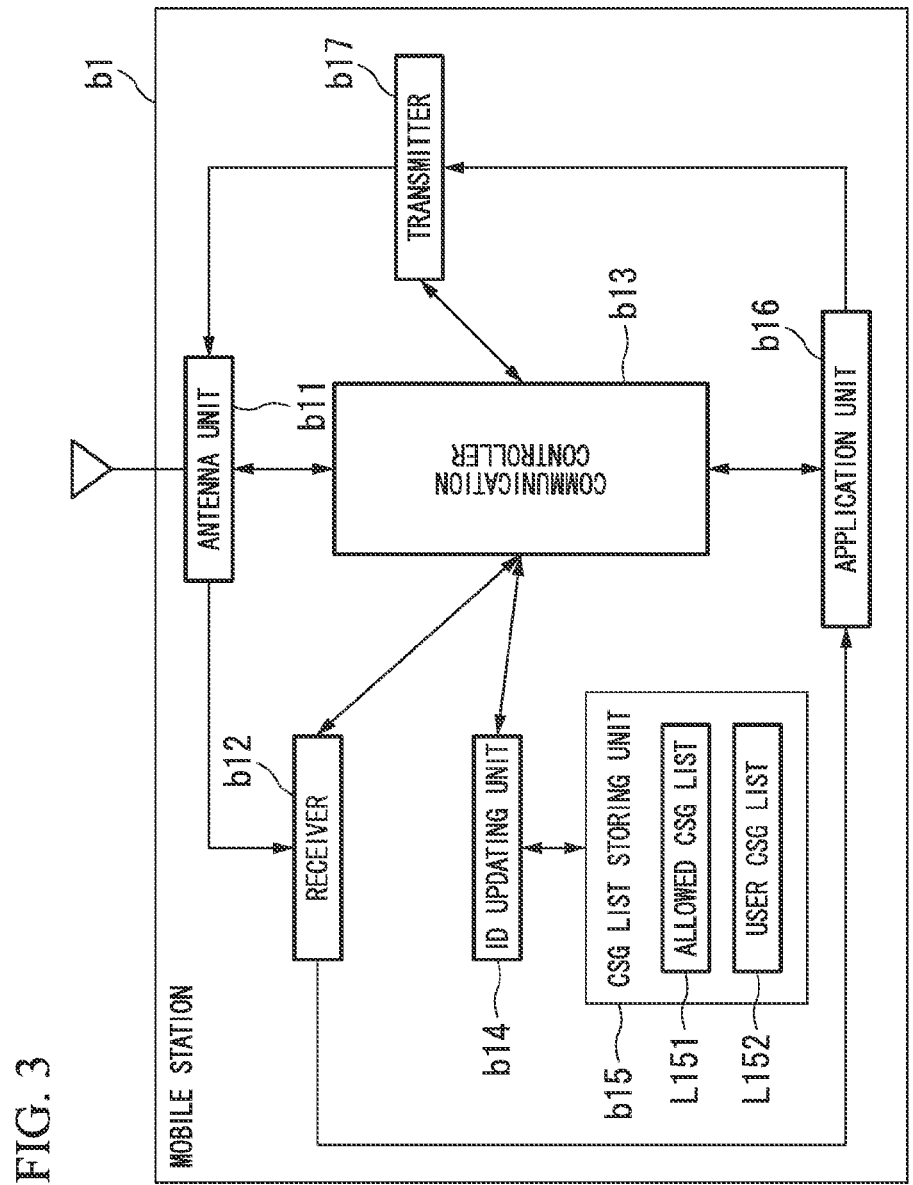
FIG. 3 is a schematic block diagram illustrating a configuration of a mobile station according to the first embodiment.

FIG. 3 is a schematic block diagram illustrating a configuration of the mobile station b1 according to the first embodiment. The mobile station b1 includes: an antenna unit b11; a receiver b12; a communication controller b13; an ID updating unit b14; a CSG list storing unit b15; an application unit b16; and a transmitter b17.

The antenna unit b11 receives, through an antenna, a radio signal from the home cell base station h1. Then, the antenna unit b11 outputs the received signal to the receiver b12. Additionally, the antenna unit b11 transmits, to the home cell base station h1, the signal received from the transmitter b17 as a radio signal.

The receiver b12 downconverts the signal received from the antenna unit b11 to perform A/D conversion. Then, the receiver b12 demodulates and decodes the signal subjected to the A/D conversion to obtain reception information. Then, the receiver b12 outputs the obtained reception information to the communication controller b13 and the application unit b16.

The communication controller b13 controls each unit of the mobile station b1. For example, the communication controller b13 outputs, to the ID updating unit b14, an ID registration request included in the reception information received from the receiver b12. Additionally, for example, the communication controller b13 transmits the completion response received from the ID updating unit b14, to the home cell base station h1 through the transmitter b17 and the antenna unit b11.

The ID updating unit b14 (identification information updating unit) extracts a CSG ID from the ID registration request received from the communication controller b13. The ID updating unit b14 additionally registers the extracted CSG ID to the allowed CSG list L151 stored by the CSG list storing unit b15. In other words, the ID updating unit b14 causes the mobile station device b1 to store the CSG ID assigned to the home cell base station h1 that changes the access control method to the hybrid access method.

Further, if the registration of the CSG ID is completed, the ID updating unit b14 outputs a completion response thereof to the communication controller b13. If a validity period of the membership is included in the ID registration request, the ID updating unit b14 deletes the CSG ID from the allowed CSG list L151 (FIG. 3) after the validity period expires.

The CSG list storing unit b15 stores the allowed CSG list L151 and the user CSG list L152. Here, the ID updating unit b14 and the CSG list storing unit b15 may be USIM (User Subscriber Identity Module) attachable/detachable to/from the mobile station.

The application unit b16 processes reception information received from the receiver b12. For example, the application unit b16 performs processes, such as a user interfacing, a browsing, and a mailing.

The transmitter b17 encodes and modulates the transmission information received from the communication controller b13 and the application unit b16 to perform D/A conversion. Then, the transmitter b17 upconverts the signal subjected to the D/A conversion, and outputs the upconverted signal to the antenna unit b11.

(Regarding Operation of Each Device in Wireless Communication System 1)

Figure 4:
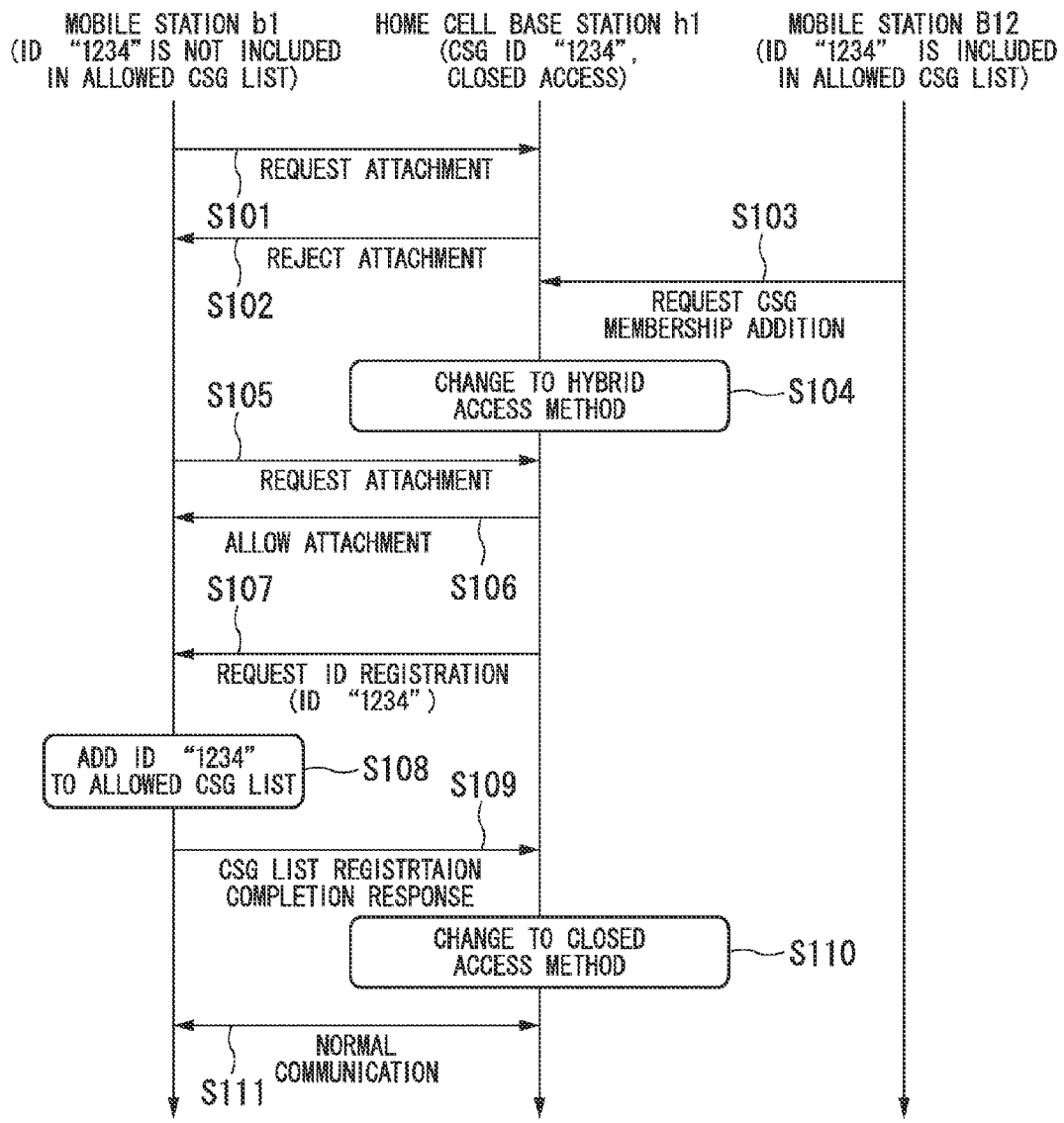
FIG. 4 is a sequence chart illustrating operation of each device in the wireless communication system according to the first embodiment.

FIG. 4 is a sequence chart illustrating operation of each device in the wireless communication system 1 according to the first embodiment. This drawing illustrates an initial state where CSG ID "1234" is assigned to the home cell base station h1, and the home cell base station h1 performs access control with the closed access method of allowing only mobile station devices having the CSG membership to the CSG ID to access the home cell base station h1. Additionally, this drawing illustrates the initial state where the CSG ID "1234" is not included in the allowed CSG list stored by the mobile station b1, and the CSG ID "1234" is included in the allowed CSG list stored by the mobile station B12 in the initial state. In other words, the mobile station B12 has the membership to the CSG having the CSG ID "1234," and can access the home cell base station h1 even in a case other than an emergency call.

(Step S101) The mobile station b1 transmits an attachment request to the home cell base station h1. Then, the routine proceeds to step S102.

(Step S102) The home cell base station h1 determines that the mobile station b1 does not have the membership to the CSG, and transmits attachment denial to the mobile station b1. In other words, at this stage, the mobile station b1 does not have the membership to the CSG having the CSG ID "1234," and cannot access the home cell base station h1 except in a case of an emergency call. Then, the routine proceeds to step S103.

(Step S103) The mobile station B12 transmits a CSG member addition request to the home cell base station b1 based on manual CSG selection by a user. Then, the routine proceeds to step S104.

(Step S104) The home cell base station h1 changes the access control method from the closed access method to the hybrid access method. Then, the routine proceeds to step S105.

(Step S105) The mobile station b1 transmits an attachment request to the home cell base station h1. Then, the routine proceeds to step S106.

(Step S106) Since the access control method is the hybrid method, the home cell base station h1 transmits attachment allowance even to the mobile station b1 not having the membership to the CSG. Thereby, the mobile station b1 can access the home cell base station h1. Then, the routine proceeds to step S107.

(Step S107) The home cell base station h1 transmits an ID registration request of the CSG ID "1234" to the mobile station b1. Then, the routine proceeds to step S108.

(Step S108) The mobile station b1 additionally registers the CSG ID "1234" to the allowed CSG list. Thereby, the mobile station b1 can access the home cell base station h1 even in a case other than an emergency call. Then, the routine proceeds to step S109.

(Step S109) The mobile station b1 transmits, to the home cell base station h1, a completion response indicating the completion of the registration of the CSG ID "1234" to the CSG list. Then, the routine proceeds to step S110.

(Step S110) The home cell base station h1 changes the access control method from the hybrid access method to the closed access method. Then, the routine proceeds to step S111.

(Step S111) The mobile station b1 accesses the home cell base station h1 to perform communication. The communication (normal communication) includes communication other than an emergency call.

As explained above, according to the present embodiment, the wireless communication system 1 changes the access control method of the home cell base station h1 to the hybrid access method. Then, the wireless communication system 1 causes the mobile station b1 to store the CSG ID assigned to the home cell base station h1 which has changed the access control method to the hybrid access method. Then, the wireless communication system 1 changes the access control method of the home cell base station h1 from the changed hybrid access method to the closed access method. Thereby, the wireless communication system 1 can reliably offer the CSG membership to the mobile station b1 not subscribing to the CSG.

Additionally, according to the first embodiment, the wireless communication system 1 changes the access control method to the hybrid access method based on the subscribing device addition request from the mobile station B12 subscribing to the CSG assigned to the home cell base station h1. Accordingly, the mobile station B12 subscribing to the CSG can reliably offer the CSG membership to the mobile station b1 not subscribing to the CSG. For example, it is possible to allow an acquaintance invited home to access a home cell.

Further, according to the present embodiment, the wireless communication system 1 changes the access control method to the closed access method based on the completion response indicating that the CSG ID is stored in the mobile station b1. Accordingly, the wireless communication system 1 can change the access control method to the closed access method quickly after offering the CSG membership to the mobile station b1. Thereby, the wireless communication system 1 can reduce the opportunities for other mobile stations not having the CSG membership to access the home cell base station h1. Therefore, the number of mobile stations which has the CSG membership and therefore can access the home cell base station h1 can be limited, thereby smoothly operating the home cell base station h1.

Second Embodiment

Hereinafter, a second embodiment of the present invention is explained in detail with reference to the drawings.

The explanations have been given in the above first embodiment with respect to the case where the home cell base station h1 changes the access control method based on the CSG membership addition request from the mobile station B12. Explanations are given in the second embodiment with respect to a case where a home cell base station changes the access control method with a predetermined period.

A schematic diagram of a wireless communication system 2 according to the second embodiment is the same as FIG. 1, therefore is omitted here. Hereinafter, the home cell base station H is referred to as a home cell base station h2. Additionally, functions and configurations of a mobile station B11 according to the second embodiment are the same as those of the mobile station b1. Therefore, explanations thereof are omitted here.

Figure 5:
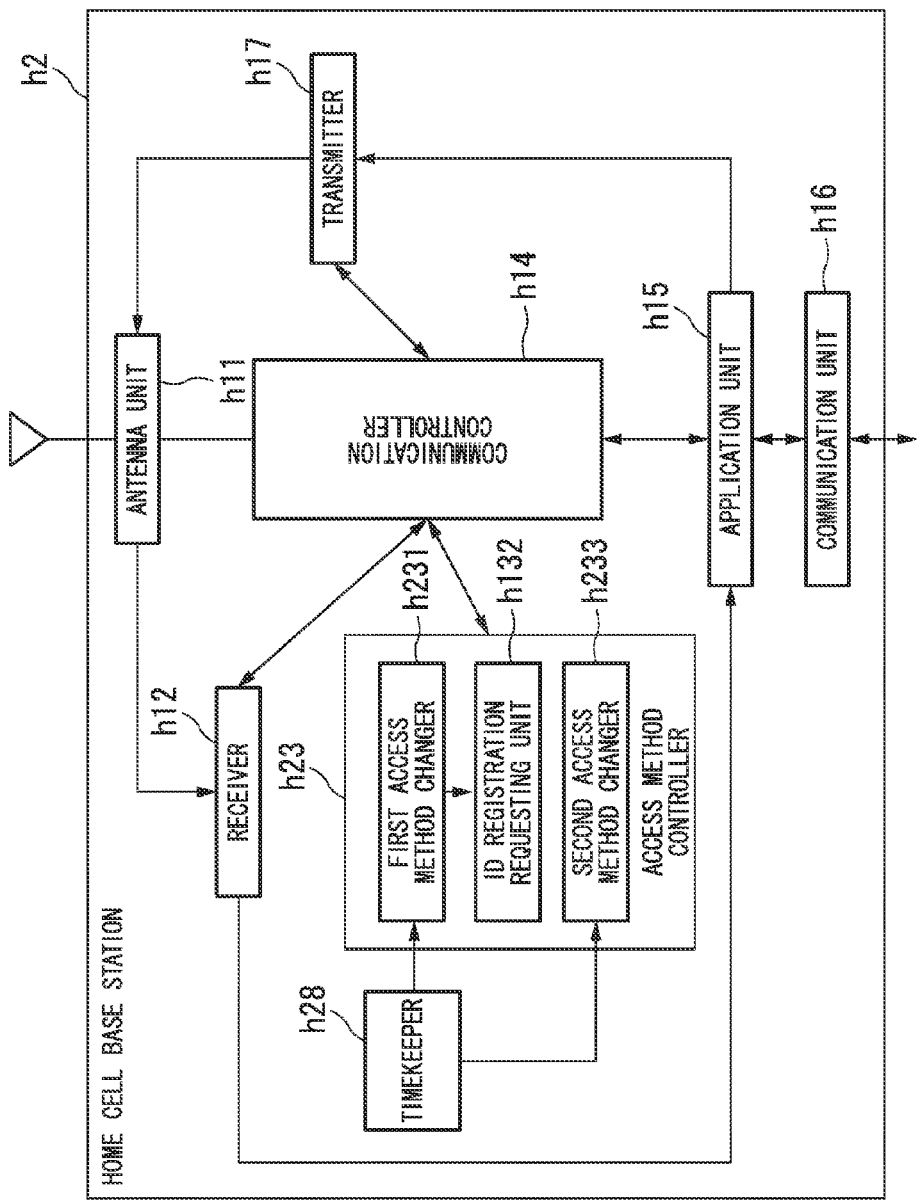
FIG. 5 is a schematic block diagram illustrating a configuration of a home cell base station according to a second embodiment of the present invention.

FIG. 5 is a schematic block diagram illustrating a configuration of the home cell base station h2 according to the second embodiment of the present invention. If the home cell base station h2 (FIG. 5) according to the second embodiment is compared to the home cell base station h1 according to the first embodiment (FIG. 2), a first access method changer h231, a second access method changer h233, and a timekeeper h28 of an access method controller h23 differ. However, functions of other constituent elements (the antenna unit h11, the receiver h12, the ID registration requesting unit h132, the communication controller h14, the application unit h15, the communication unit h16, and the transmitter h17) are the same as those of the first embodiment. Therefore, explanations of the same functions as those of the first embodiment are omitted here.

The timekeeper h28 outputs the counted time to the first access method changer h231 and the second access method changer h232. The timekeeper h28 includes a counter. At the time a counted value of the counter expires, the timekeeper h28 resets the counter, outputs to the first access method changer h231, a signal that causes generation of a change order which will be explained later, and initiates a timekeeping again. At the time the counted value indicates T0, the timekeeper h28 outputs, to the second access method changer h233, a signal that causes generation of a change order. Additionally, the timekeeper h28 regards the time the counted value indicates T0+T2 as the time the counted value of the counter expires, and resets the counter.

Upon receiving the signal from the timekeeper h28, the first access method changer h231 outputs, to the communication controller h14, a change order for changing the access control method to the hybrid access method. In other words, the first access method changer h231 changes the access control method to the hybrid access method at the time the timekeeper h28 initiates the timekeeping, and at the time a predetermined period T2 elapses from the time the second access method changer h233 as will be explained later changes the access control method to the closed access method.

Upon receiving the signal from the timekeeper h28, the second access method changer h233 outputs, to the communication controller h14, a change order for changing the access control method to the closed access method. In other words, the second access method changer h233 changes the access control method to the closed access method at the time a predetermined period T0 elapses from the time the access control method is changed to the hybrid access method.

Thereby, the access control method of the home cell base station h2 is repeatedly changed in such a manner that the access control method is the hybrid access method during the period T0 and is the closed access method during the period T2.

(Regarding Operation of Each Device in Wireless Communication System 2)

Figure 6:
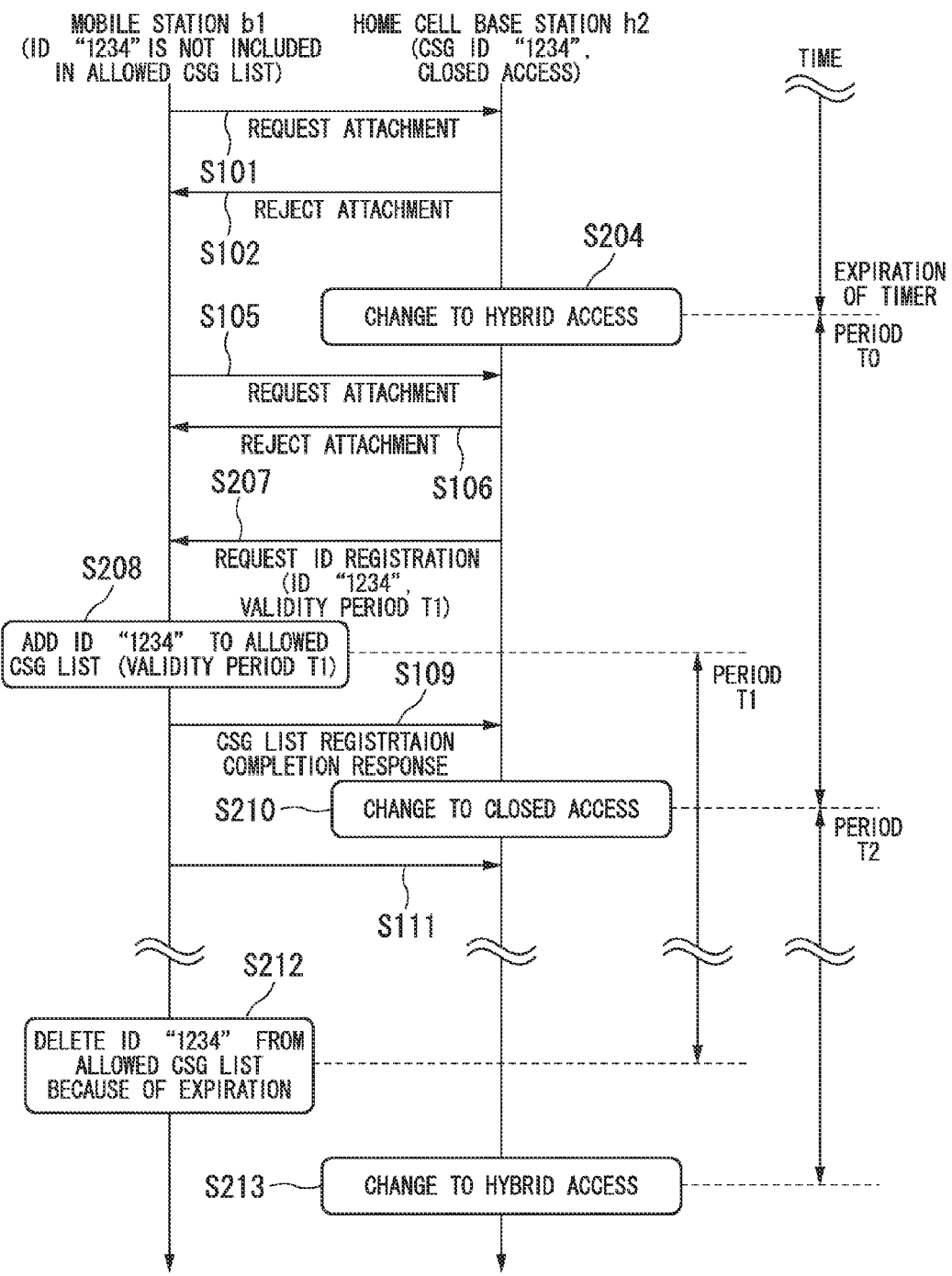
FIG. 6 is a sequence chart illustrating operation of each device in the wireless communication system according to the second embodiment.

FIG. 6 is a sequence chart illustrating operation of each device of the wireless communication device 2 according to the second embodiment. If the sequence chart (FIG. 6) of the second embodiment is compared to the sequence chart (FIG. 4) of the first embodiment, the processes in steps S101, S102, S105, S106, S109, and S111 are the same. Therefore, explanations of the same processes as those of the first embodiment are omitted here. Additionally, FIG. 6 illustrates a case where the initial states of the mobile station b1 and the home cell base station h2 are the same as those of the mobile station b1 and the home cell base station h1 of the first embodiment (FIG. 4), respectively.

(Step S204) The mobile station b1 changes the access control method from the closed access method to the hybrid access method at the time the timer expires and a new timekeeping is initiated. Then, the routine proceeds to step S105.

(Step S207) The home cell base station h2 transmits, to the mobile station b1, an ID registration request including the CSG ID "1234" and the validity period T1 of the membership to the CSG having that CSG ID. Then, the routine proceeds to step S208.

(Step S208) The mobile station b1 additionally registers the CSG ID "1234" and the validity period T1 to the allowed CSG list. Thereby, the mobile station b1 can access the home cell base station h2 during the validity period T1 even in a case other than an emergency call. Then, the routine proceeds to step S109.

(Step S209) The home cell base station H2 changes the access control method to the closed access method at the time the predetermined period T0 elapses from the time the access control method is changed in step S204 to the hybrid access method. Then, the routine proceeds to step S111.

(Step S212) The mobile station b1 deletes the CSG ID "1234" registered in step S208 from the allowed CSG list at the time the predetermined period T1 elapses from the time the CSG ID is additionally registered in step S208.

(Step S213) The home cell base station h2 changes the access control method to the hybrid access method at the time the predetermined period T2 elapses from the time the access control method is changed in step S210 to the closed access method.

As explained above, according to the second embodiment, the wireless communication system 2 periodically repeats the closed access method and the hybrid access method. Thereby, the wireless communication system 2 can set a validity period to the CSG membership, and update the CSG membership while the access control method is the hybrid access method, thereby preventing the membership to the unused CSG from being left for a long time.

Additionally, in the second embodiment, the period T1 and the period T2 may be set to be substantially the same, and the period T0 may be set to be relatively shorter than the period T1 and the period T2. In this case, the period T1 and the period T2 end at substantially the same time. For this reason, the membership to the CSG whose validity period is T1 can be offered to the mobile station b1. If the validity period expires, a membership to a new CSG can be offered to the mobile station b1, thereby updating a CSG membership while maintaining the CSG membership.

Third Embodiment

Hereinafter, a third embodiment of the present invention is explained in detail with reference to the drawings.

Explanations are given in the third embodiment with respect to a case where a home cell base station changes an access control method based on the number of mobile stations subscribing to a CSG.

A schematic diagram of a wireless communication system 3 according to the third embodiment is the same as FIG. 1. In the third embodiment, however, multiple mobile stations (referred to as other mobile stations) having the same configuration as that of the mobile station b1 are present in a cell C3. Hereinafter, the home cell base station H is referred to as a home cell base station h3. Additionally, functions and configurations of the mobile station B11 according to the third embodiment are the same as those of the mobile station b1. Therefore, explanations thereof are omitted here.

Figure 7:
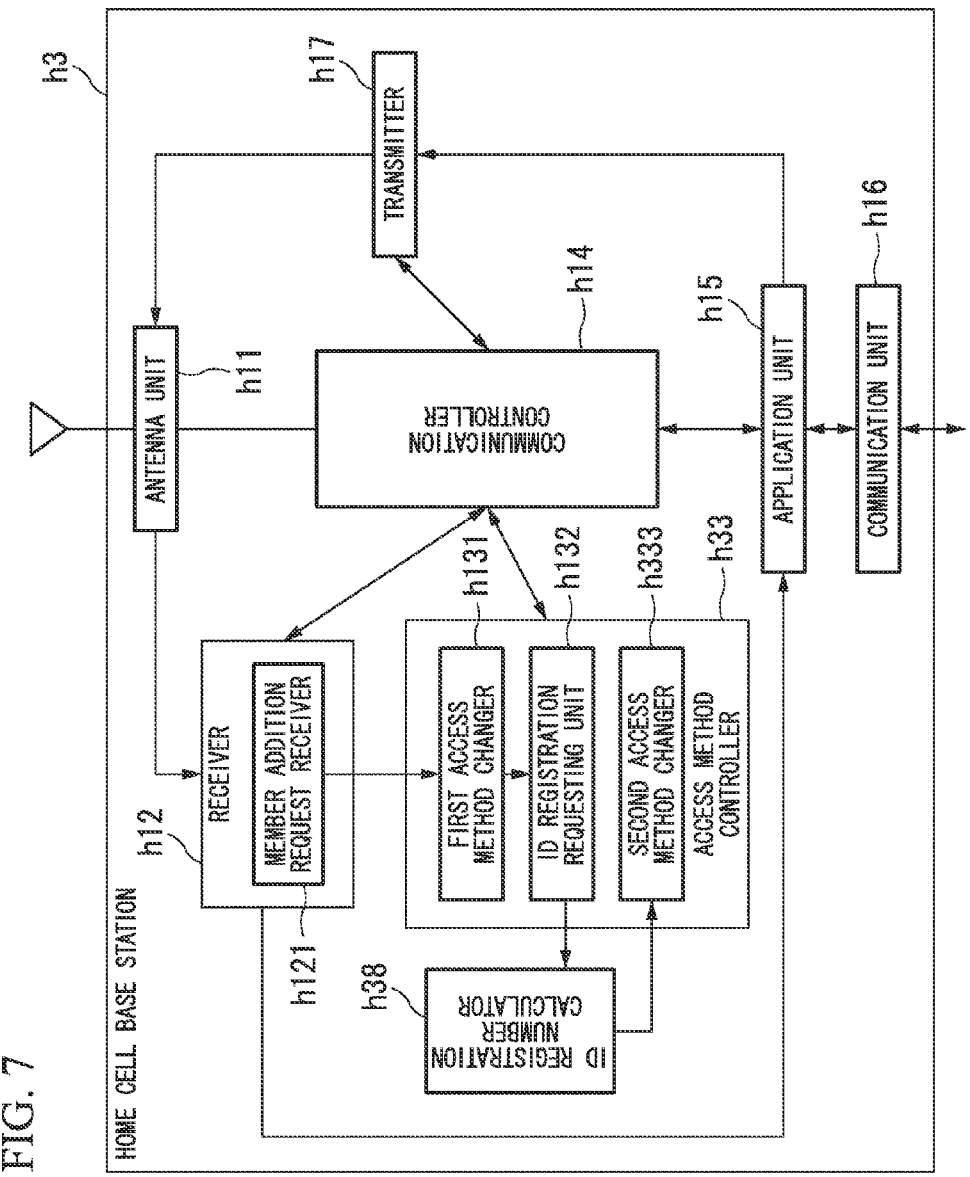
FIG. 7 is a schematic block diagram illustrating a configuration of a home cell base station according to a third embodiment of the present invention.

FIG. 7 is a schematic block diagram illustrating a configuration of the home cell base station h3 according to the third embodiment of the present invention. If the home cell base station h3 (FIG. 7) according to the third embodiment is compared to the home cell base station h1 according to the first embodiment (FIG. 2), a second access method changer h333 and an ID registration number calculator h38 of an access method controller h33 differ. However, functions of other constituent elements (the antenna unit h11, the receiver h12, the first access method changer h131, the ID registration requesting unit h132, the communication controller h14, the application unit h15, the communication unit h16, and the transmitter h17) are the same as those of the first embodiment. Therefore, explanations of the same functions as those of the first embodiment are omitted here.

Upon receiving a completion response from the ID registration requesting unit h132, the ID registration number calculator h38 counts the number of the completion responses. Thereby, the ID registration number calculator h38 accesses the home cell base station h3, and counts the number of mobile stations whose CSG IDs are registered to the CSG list, that is, the number of mobile stations subscribing to the CSG (referred to as the CSG subscriber number). The ID registration number calculator h38 outputs the counted CSG subscriber number to the second access method changer b333.

If the CSG subscriber number received from the ID registration number calculator h38 is equal to or greater than a predetermined value K, the second access method changer h333 outputs, to the communication controller h14, a change order for changing the access control method from the hybrid access method to the closed access method. In other words, the second access method changer h333 changes the access control method to the closed access method based on the number of mobile stations subscribing to the CSG (Regarding Operation of Each Device in Wireless Communication System 3)

Figure 8:
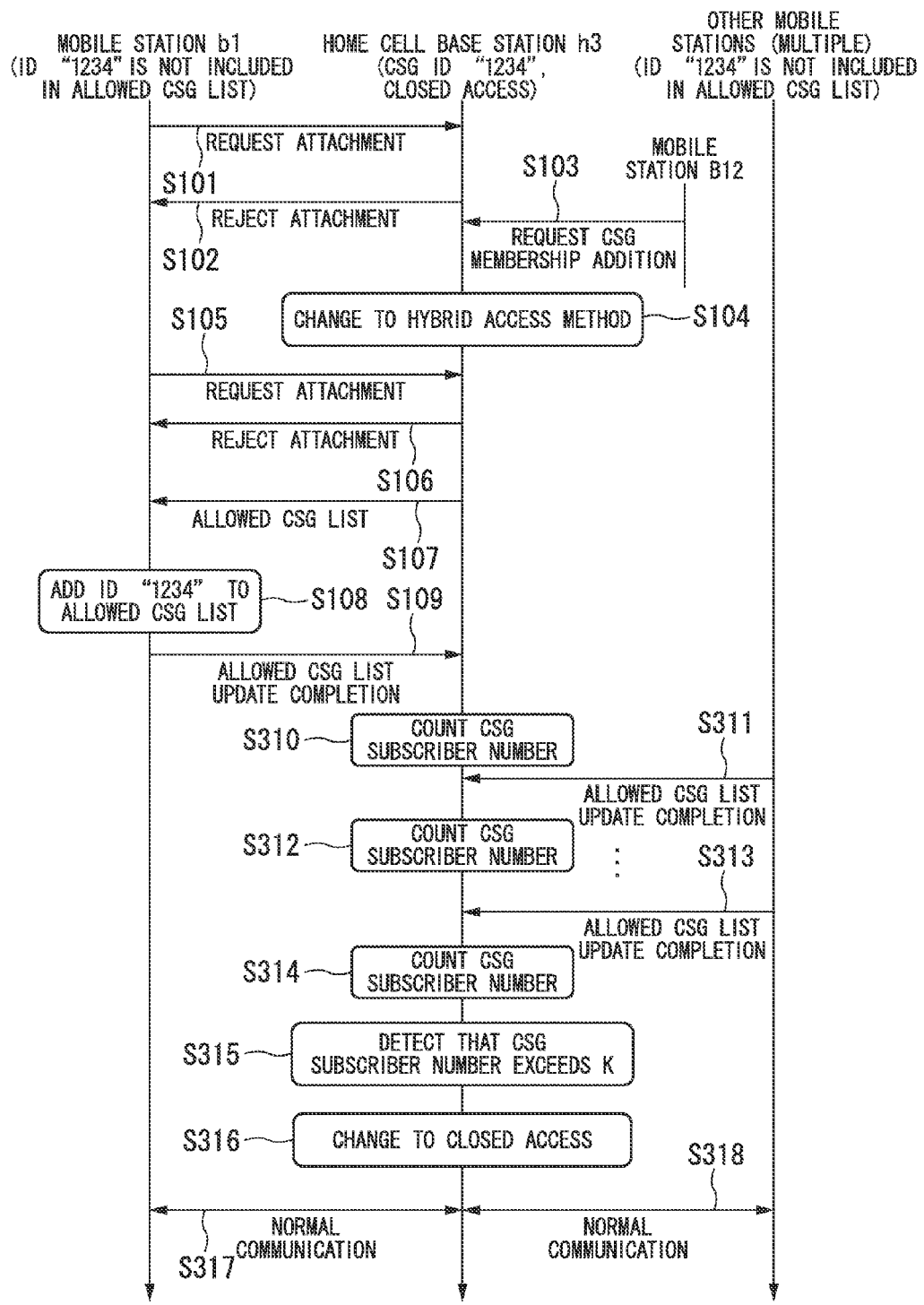
FIG. 8 is a sequence chart illustrating operation of each device in the wireless communication system according to the third embodiment.

FIG. 8 is a sequence chart illustrating operation of each device of the wireless communication device 3 according to the third embodiment. If the sequence chart of the third embodiment (FIG. 8) is compared to the sequence chart of the first embodiment (FIG. 4), the processes in steps S101 to S109 are the same. Therefore, explanations of the same processes as those of the first embodiment are omitted here. Additionally, FIG. 8 illustrates a case where the initial states of the mobile station b1 and the home cell base station h3 are the same as those of the mobile station b1 and the home cell base station h1 of the first embodiment (FIG. 4), respectively. Further, FIG. 8 illustrates a case where the initial state of the mobile station B12 is the same as that of the first embodiment.

(Step S310) The home cell base station h3 increments by one the number of completion responses, that is, the CSG subscriber number. Then, the routine proceeds to step S311.

(Step S311) Similar to the mobile station b1, one of the other mobile stations registers a CSG ID and transmits a completion response thereof to the home cell base station h3. Then, the routine proceeds to step S312.

(Step S312) The home cell base station h3 increments by one the CSG subscriber number. Then, another one of the other mobile stations performs the similar process to the step S311. In response to that process, the home cell base station h3 performs the process in step S312. Then, the routine proceeds to step S313.

(Step S313) Similar to the mobile station b1, another one of the other mobile stations registers a CSG ID and transmits a completion response thereof to the home cell base station h3. Then, the routine proceeds to step S314.

(Step S314) The home cell base station h3 increments by one the CSG subscriber number. Then, the routine proceeds to step S315.

(Step S315) The home cell base station h3 detects that the CSG subscriber number counted in step S314 becomes equal to or more than K. Then, the routine proceeds to step S316.

(Step S316) The home cell base station h3 changes the access control method from the hybrid access method to the closed access method. Then, the routine proceeds to step S317.

(Step S317) The mobile station b1 accesses the home cell base station h3 and performs communication. This communication includes communication other than an emergency call. Then, the routine proceeds to step S318.

(Step S318) The other respective mobile stations b1 access the home cell base station h3 and perform communication. This communication includes communication other than an emergency call.

As explained above, according to the third embodiment, the wireless communication system 3 changes the access control method to the closed access method based on the number of mobile stations subscribing to the CSG, thereby limiting the number of mobile station devices subscribing to the CSG.

In each of the above embodiments, the home cell base stations h1, h2, and h3 may perform access control with the closed access method by allowing only mobile stations having transmitted, by attachment requests, the CSG ID assigned to the home cell base stations. Additionally, the home cell base stations h1, h2, and h3 may store identification informations of mobile stations subscribing to the CSG and perform access control with the closed access method by allowing only mobile stations having the stored identification informations to perform attachment.

The case where the home cell base station h2 changes the access control method with the predetermined period has been explained in the second embodiment. However, the present invention is not limited thereto. The home cell base station h2 may change the access control method to a predetermined access control method at a predetermined time. In this case, the timekeeper h28 outputs time information to the first access method changer h231 and the second access method changer h233.

For example, the home cell base station h2 installed at a store or the like which provides sale of goods or services changes the access control method to the hybrid access method only for a predetermined hours (for example, from 9:00 to 10:00), and offers the CSG membership. Additionally, the home cell base station h2 may provide to a user of a mobile station subscribing to that CSG, discount services such as grant of discounts on goods or services, cash vouchers or points, coupon tickets, and the like. Thereby, the store or the like can attract customers at the predetermined hour.

In the first and third embodiments, the CSG membership addition request may include identification information of the mobile station b1 to which the CSG membership is offered, and the home cell base station h1 and h3 may transmit the ID registration request only to the mobile station b1 having the identification information included in the CSG membership addition request. Additionally, the home cell base stations h1 and h3 may allow the mobile station b1 having this identification information to perform attachment.

In the third embodiment, the wireless communication system 3 changes the access control method to the closed access method based on the number of mobile stations subscribing to the CSG. However, the present invention is not limited thereto. The wireless communication system 3 may change the access control method to the closed access method based on the number of mobile station devices subscribing to the CSG and accessing (attaching to) the home cell base station h3. Specifically, if the number of these mobile station devices is equal to or greater than the predetermined value K, the wireless communication system 3 changes the access control method from the hybrid access method to the closed access method, thereby limiting the number of mobile stations accessing the home cell base station h3.

In the above third embodiment, the home cell base station h3 may change the predetermined value K. For example, according to the throughput required for each mobile station, the home cell base station h3 may set K to be small if the larger throughput is required, or set K to be large if large throughput is not necessary as long as access is enabled.

In the above third embodiment, the home cell base station h3 may subtract, from the CSG subscriber number, the number of mobile stations having lost the membership because of expiration of the validity period, revocation of the membership, disconnection of the access (attachment), or the like. In this case, if the CSG subscriber number becomes smaller than the predetermined value K, the home cell base station h3 may change the access control method from the closed access method to the hybrid access method.

A computer may implement part of the home cell base stations h1, h2, and h3 and part of the mobile stations b1 and B12, such as the member addition request receiver h121, the first access method changers h131 and h231, the ID registration requesting unit h132, the second access method changers h133, h233, and h333, the communication controller h14, the communication controller h13, the ID updating unit b14, the timekeeper h28, and the ID registration number calculator h38. In this case, a computer-readable recording medium may store a program for implementing these control functions, so that a computer system reads and executes the program stored in the recording medium and thereby implement the control functions. Here, the "computer systems" are computer systems included in the home cell base stations h1, h2, and h3, or the mobile stations b1 and B12, and include OS and hardware, such as a peripheral device. Additionally, the "computer readable recording medium" includes a portable medium such as a flexible disc, a magneto-optical disc, a ROM, and a CD-ROM, and a storage device such as a hard disk built in the computer system. Further, the "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Moreover, the program may be a program for implementing part of the aforementioned functions. Further, the program may be a program that can implement the aforementioned functions in combination with a program already recorded in the computer system.

Although the embodiments of the present invention have been explained with reference to the drawings, specific configurations are not limited thereto. Various design modifications may be made without departing from the scope of the present invention.

INDUSTRIAL APPLICABILITY

The present invention is suitable to be used for a communication system, a mobile station device, and a base station device, and makes it possible to reliably offer a membership to a group.

DESCRIPTION OF REFERENCE SYMBOLS

H, h1, h2, and h3: home cell base station
B11 and b1: mobile station
B12: mobile station
h11: antenna unit
h12: receiver
h13, h23, and h33: access method controller
h14: communication controller
h15: application unit
h16: communication unit
h17: transmitter
h121: member addition request receiver
h131 and h231: first access method changer
h132: ID registration requesting unit
h133, h233, and h333: second access method changer
b11: antenna unit
b12: receiver
b13: communication controller
b14: ID updating unit
b15: CSG list storing unit
h16: application unit
b17: transmitter
L151: allowed CSG list
L152: user CSG list
h28: timekeeper
h38: ID registration number calculator

The invention claimed is:

1. An access control method for a wireless communication system including a base station device and a first mobile station device, the base station device being assigned with identification information of a group, the base station device being configured to perform a control with a first access control method in which a mobile station device subscribing to the group is allowed to access the base station device, the first mobile station device being configured to access the base station device, the access control method comprising:

a first step of a first access method changer included in the base station device changing an access control method of the base station device to a third access control method in which the control with the first access control method and a control with a second access control method are performed simultaneously, the second access method being such that any mobile station device including the first mobile station device and a second mobile station device different from the first mobile station device is allowed to access the base station device, the first step being made based on a subscribing device addition request, the subscribing device addition request being transmitted from the second mobile station device subscribing to the group having the identification information of the group assigned to the base station device, the subscribing device addition request requesting the base station device to offer a membership to the group to the first mobile station device;

a second step of an identification information updating unit included in the first mobile station device storing, in the first mobile station device, the identification information of the group assigned to the base station device having changed the access control method to the third access control method in the first step; and a third step of a second access method changer included in the base station device changing the access control method of the base station device from the third access control method changed in the first step to the first access control method, the third step being made based on a completion report, the completion report being transmitted from the first mobile station device, the completion report notifying the base station device of completion of storing, in the first mobile station device, the identification information of the group.

2. The access control method according to claim 1, wherein the third step comprises changing the third access control method to the first access control method after a predetermined period elapses from the time the access control method is changed to the third access control method in the first step.

3. The access control method according to claim 1, wherein the first step and the second step are periodically repeated.

4. The access control method according to claim 1, wherein the third step comprises changing the access control method to the first access control method based on the number of mobile station devices subscribing to the group.

5. The access control method according to claim 4, wherein the third step comprises changing the access control method to the first access control method based on the number of mobile station devices subscribing to the group and accessing the base station device.

6. An access control method for a base station device, the base station device being assigned with identification information of a group, the base station device being configured to perform a control with a first access control method in which a mobile station device subscribing to the group is allowed to access the base station device, the access control method comprising:

a first step of a first access method changer changing an access control method of the base station device to a third access control method in which the control with the first access control method and a control with a second access control method are performed simultaneously, the second access method being such that any mobile station device including a first mobile station device and a second mobile station device different from the first mobile station device is allowed to access the base station device, the first step being made based on a subscribing device addition request, the subscribing device addition request being transmitted from the second mobile station device subscribing to the group having the identification information of the group assigned to the base station device, the subscribing device addition request requesting the base station device to offer a membership to the group of the first mobile station device, the second mobile station device; and a second step of a second access method changer changing the access control method of the base station device from the third access control method changed in the first step to the first access control method, the second step being made based on a completion report, the completion report being transmitted from the first mobile station device, the completion report notifying the base station device of completion of storing, in the first mobile station device, the identification information of the group.

7. An access control method for a first mobile station device, the first mobile station device being configured to access a base station device, the base station device being assigned with identification information of a group, the base station device being configured to perform a control with a first access control method in which a mobile station device subscribing to the group is allowed to access the base station device, the access control method comprising:

a first step of storing, in the first mobile station device, the identification information of the group assigned to the base station device having changed an access control method of the base station device to a third access control method in which a control with the first access control method and a control with a second access control method are performed simultaneously, the second access method being such that any mobile station device including the first mobile station device and a second mobile station device different from the first mobile station device is allowed to access the base station device; and a second step of transmitting to the base station device, a completion report, the completion report notifying the base station device of completion of storing, in the first mobile station device, the identification information of the group.

8. A wireless communication system comprising:

a base station device which is assigned with identification information of a group and which is configured to perform a control with a first access control method in which a mobile station device subscribing to the group is allowed to access the base station device; and a first mobile station device configured to access the base station device, wherein the first mobile station device comprises:

an identification information updating unit configured to store, in the mobile station device, the identification information of the group assigned to the base station device having changed an access control method of the base station device to a third access control method in which the control with the first access control method and a control with a second access control method are performed simultaneously, the second access method being such that any mobile station device including the first mobile station device and a second mobile station device different from the first mobile station device is allowed to access the base station device, the storing being made based on a subscribing device addition request, the subscribing device addition request being transmitted from the second mobile station device subscribing to the group having the identification information of the group assigned to the base station device, the subscribing device addition request requesting the base station device to offer a membership to the group to the first mobile station device; and a transmitter configured to transmit, to the base station device, a completion report, the completion report notifying the base station device of completion of storing, in the first mobile station device, the identification information of the group, the base station device comprises:

a first access method changer configured to change, based on the subscribing device addition request, an access control method of the base station device to the third access control method; and a second access method changer configured to change, based on the completion report, the access control method of the base station device from the third access control method changed by the first access method changer to the first access control method.

9. A base station device which is assigned with identification information of a group and which is configured to perform a control with a first access control method in which a mobile station device subscribing to the group is allowed to access the base station device, the base station device comprising:
   a first access method changer configured to change an access control method of the base station device to a third access control method in which the control with the first access control method and a control with a second access control method are performed simultaneously, the second access method being such that any mobile station device including a first mobile station device and a second mobile station device different from the first mobile station device is allowed to access the base station device, the change of the access control method to the third access control method being made based on the subscribing device addition request, the subscribing device addition request being transmitted from the second mobile station device subscribing to the group having the identification information of the group assigned to the base station device, the subscribing device addition request requesting the base station device to offer a membership to the group to the first mobile station device; and
   a second access method changer configured to change the access control method of the base station device from the third access control method changed by the first access method changer to the first access control method, the change of the access control method to the first access control method being made based on a completion report, the completion report being transmitted from the first mobile station device, the completion report notifying the base station device of completion of storing, in the first mobile station device, the identification information of the group.

10. A first mobile station device configured to access a base station device, the base station device being assigned with identification information of a group, the base station device being configured to perform a control with a first access control method in which a mobile station device subscribing to the group is allowed to access the base station device, the first mobile station device comprising:
    an identification information updating unit configured to store, in the first mobile station device, the identification information of the group assigned to the base station device having changed an access control method of the base station device to a third access control method in which a control with the first access control method and a control with a second access control method are performed simultaneously, second access method being such that any mobile station device including the first mobile station device and a second mobile station device different from the first mobile station device is allowed to access the base station device; and
    a transmitter configured to transmit, to the base station device, a completion report, the completion report notifying the base station device of completion of storing, in the first mobile station device, the identification information of the group.

11. A non-transitory computer readable recording medium storing an access control program causing a computer of a base station device, the base station device being assigned with identification information of a group, the base station device being configured to perform a control with a first access control method in which a mobile station device subscribing to the group is allowed to access the base station device, the access control program making the computer:
    change an access control method of the base station device to a third access control method in which the control with the first access control method and a control with a second access control method are performed simultaneously, the second access method being such that any mobile station device including a first mobile station device and a second mobile station device different from the first mobile station device is allowed to access the base station device, the change of the access control method to the third access control method being made based on a subscribing device addition request, the subscribing device addition request being transmitted from the second mobile station device subscribing to the group having the identification information of the group assigned to the base station device, the subscribing device addition request requesting the base station device to offer a membership to the group to the first mobile station device; and
    change the access control method of the base station device from the changed third access control method to the first access control method, the change of the control method to the first access control method being made based on a completion report, the completion report being transmitted from the first mobile station device, the completion report notifying the base station device of completion of storing, in the first mobile station device, the identification information of the group.

12. A non-transitory computer readable recording medium storing an access control program causing a first mobile station device, the first mobile station device being configured to access a base station device, the base station device being assigned with identification information of a group, the base station device being configured to perform a control with a first access control method in which a mobile station device subscribing to the group is allowed to access the base station device, the access control program making the computer:
    store, in the first mobile station device, the identification information of the group assigned to the base station device having changed an access control method of the base station device to a third access control method in which a control with the first access control method and a control with a second access control method are performed simultaneously, the second access method being such that any mobile station device including the first mobile station device and a second mobile station device different from the first mobile station device is allowed to access the base station device; and
    transmit, to the base station device, a completion report, the completion report notifying the base station device of completion of storing, in the first mobile station device, the identification information of the group.

13. The access control method according to claim 1, further comprising:
    a fourth step of accessing, by the first mobile station device, to the base station device by using the first access control method, the fourth step being performed after the third step, the fourth step being performed by using the identification information stored, in the first mobile station device, in the second step.

14. The access control method according to claim 6, further comprising:

a third step of being accessed by the first mobile station device by using the first access control method, the third step being performed after the second step, the third step being performed by using the identification information stored in the first mobile station device.

15. The access control method according to claim 7, further comprising:
a third step of accessing, by the first mobile station device, to the base station device by using the first access control method, the third step being performed after the second step, the third step being performed by using the identification information stored in the first mobile station device.

16. The wireless communication system according to claim 8, wherein
the first mobile station device further comprises:
a communication controller configured to access to the base station device by using the first access control method after the access control method of the base station device is changed from the third access control method to the first access control method.

17. The base station device according to claim 9, wherein
the base station device further comprises:
a communication controller configured to be accessed by the first mobile station device by using the first access control method after the access control method of the base station device is changed from the third access control method to the first access control method.

18. The first mobile station device according to claim 10, wherein
the first mobile station device further comprises:
a communication controller configured to access the base station device by using the first access control method after the access control method of the base station device is changed from the third access control method to the first access control method.

19. The non-transitory computer readable recording medium according to claim 11, wherein
the access control program further makes the computer:
be accessed by the first mobile station device by using the first access control method after the access control method of the base station device is changed from the third access control method to the first access control method.

20. The non-transitory computer readable recording medium according to claim 12, wherein
the access control program further makes the computer:
access to the base station device by using the first access control method after the access control method of the base station device is changed from the third access control method to the first access control method.

* * * * *